United States Patent Office 3,321,427
Patented May 23, 1967

3,321,427
COMPOSITION CONTAINING WAX, ETHYLENE-VINYL ACETATE COPOLYMER, AND POLYISOBUTYLENE
Leo W. Tyran, Lewiston, N.Y., assignor to E. I. du Pont de Nemours and Company, Wilmington, Del., a corporation of Delaware
No Drawing. Filed Sept. 4, 1963, Ser. No. 306,614
2 Claims. (Cl. 260—28.5)

This invention relates to petroleum wax compositions containing polymeric additives, and more particularly to petroleum wax compositions containing certain ethylene copolymers and also containing a polymeric additive which imparts a significant improvement in the heat-seal bond strength characteristics of such petroleum wax compositions.

It is known that the addition of ethylene/vinyl acetate (E/VA) copolymers to petroleum wax compositions gives a significant improvement in heat-seal bond strength over unmodified petroleum wax. As little as 1% E/VA copolymer based on the total composition weight gives a measurable increase in bond strength, but for many applications a level of adhesion such as is obtained with 3 to 20% E/VA copolymer is desired. Petroleum wax compositions containing up to 40% E/VA copolymer are useful as adhesives. It is also known that not only does the amount of E/VA copolymer in the wax composition affect the heat-seal bond strength, but also the vinyl acetate content of the E/VA copolymer has a significant effect. Improved adhesion characteristics of wax compositions are observed over a range of copolymerized vinyl acetate content of from 15 to 35% by weight in the copolymer, but for optimum improvement, it is necessary to have a vinyl acetate content within the critical range of 26.5 to 31.5%.

The molecular weight of the E/VA copolymer also affects the heat-seal bond strength of wax compositions containing the polymers. In particular, the heat-seal characteristics are improved as the molecular weight increases. The molecular weight of the E/VA copolymers can be expressed in terms of their inherent viscosity as determined with 0.25% of the copolymer in toluene at 30° C. On this basis, E/VA copolymers having an inherent viscosity of 0.5 to 1.5 provide a significant improvement in heat-seal bond strength, and copolymers having an inherent viscosity of 0.8 or higher are the most effective. An alternate method to indicate molecular weight of the copolymers is by means of their melt indices, as determined by the tentative ASTM test method D1238–57T. The melt indices corresponding approximately to the above-listed inherent viscosities are as follows:

| Inherent viscosity: | Melt index |
|---|---|
| 0.5 | 500 |
| 0.8 | 20 |
| 1.5 | 0.1 |

While the higher molecular weight E/VA copolymers, that is, those having an inherent viscosity above about 0.8 or having a melt index of about 20 or below, are preferred from the standpoint of heat-seal bond strength, the high molecular weight materials give more viscous compositions when blended with petroleum wax. For certain applications it is desirable to have E/VA copolymer-wax compositions with the high heat-seal bond strengths provided by the higher molecular weight E/VA copolymers and the lower viscosity characteristics obtained with lower molecular weight E/VA copolymers, for example, those with a melt index of 100 to 200 and higher.

Although E/VA copolymers impart a significant improvement in the heat-seal bond strength of petroleum wax, and petroleum wax compositions containing such copolymers are satisfactory for many uses, it is desired to provide an increase in the heat-seal bond strength of such compositions.

It is an object of this invention to improve the heat-seal bond strength characteristics of petroleum wax compositions containing an ethylene/vinyl acetate copolymer. Another object is to provide a polymeric additive which increases the heat-seal bond strength characteristics of petroleum wax compositions containing an ethylene/vinyl acetate copolymer.

These and other objects are attained with this invention by providing a heat-sealable adhesive composition comprising, by weight, (1) 60 to 99%, or preferably 80 to 97%, of petroleum wax and (1) 1 to 40%, or preferably 3 to 20%, of polymeric additives, said polymeric additives comprising (A) 80 to 99% of an ethylene/vinyl acetate copolymer having a copolymerized vinyl acetate content of 15 to 35% and having a melt index of 0.1 to 500, and (B) 1 to 20% of polyisobutylene having a molecular weight of 1000 to 250,000.

Marked improvements in the heat-seal bond strengths of E/VA copolymer-petroleum wax compositions are obtained by incorporating into such compositions 1 to 20% of polyisobutylene based on the combined weight of E/VA copolymer and polyisobutylene. Optimum heat-seal bond strengths are obtained by the use of 2 to 15% of polyisobutylene based on the combined weight of E/VA copolymer and polyisobutylene.

The polyisobutylene used as a polymeric additive in this invention must be a high molecular weight material. By this is meant that the polyisobutylene must have a molecular weight of from about 1000 to 250,000 as calculated by the Staudinger formula which is expressed as a linear function of intrinsic viscosity, and which is described in detail in the Journal of the American Chemical Society, vol. 65 (1943), p. 372. Lower molecular weight polyisobutylene is not suitable for use in this invention.

The polyisobutylene may be a homopolymer or may contain small amounts of other copolymerized monomers such as styrene. The so-called butyl rubbers which comprise polyisobutylene plus a small amount of isoprene are entirely satisfactory for use in this invention. Other butenes, i.e., butene-1 or butene-2 also may be used in this invention.

Polyisobutylene is readily available from several commercial sources, or it may be prepared by any of the suitable processes known in the art, such as disclosed in Sittig, Polyolefin Resin Processes, Gulf Publishing Company, Houston (1961).

In order to effectively increase the heat-seal bond strength of a wax composition containing an ethylene/vinyl acetate copolymer, the polyisobutylene must be added in an amount within the range of 1 to about 20%, based on combined weight of polyisobutylene and ethylene/vinyl acetate copolymer.

The ethylene/vinyl acetate copolymers suitable for use in this invention can be prepared by methods which are well known in the art. For example, the methods described in U.S. Patents 2,200,429 and 2,703,794 may be used. The copolymers contain at least 65% ethylene and 15 to 35% of copolymerized vinyl acetate, and have melt indices within the range of 0.1 to 500. Polyisobutylene modification improves the heat-seal bond strengths obtainable with copolymers throughout these ranges of comonomer content and melt index, but for optimum results it is especially effective to use E/VA copolymers with a vinyl acetate content of 26.5 to 31.5% and a melt index of 0.1 to 200.

The term "petroleum wax" as used herein refers to both paraffin and microcrystalline waxes. Paraffin wax, which is preferred for use in this invention, is a mixture of solid hydrocarbons derived from the overhead wax distillate fraction obtained from the fractional distillation of petroleum. After purification, the paraffin wax contains hydrocarbons that fall within the formulas $C_{23}H_{48}$–$C_{35}H_{72}$. It is a substantially colorless, hard, and translucent material usually having a melting point of about 125–165° F. Microcrystalline wax is obtained from the nondistillable still residues from the fractional distillation of petroleum. It differs from paraffin wax in having branched hydrocarbons of higher molecular weights. It is considerably more plastic than paraffin wax and usually has a melting point of about 150–200° F.

The composition of this invention may be prepared in any convenient manner. The E/VA copolymer and the polyisobutylene may be pre-blended and then added to molten petroleum wax with agitation or the E/VA copolymer and the polyisobutylene may be added individually to the molten petroleum wax. The E/VA copolymer and polyisobutylene may be pre-blended by hot mixing the ingredients in a Banbury mixer, on a two-roll mill, in a compounding extruder, or other such equipment. An especially convenient method is to add the polyisobutylene to the E/VA copolymer in the extruder which is commonly used in the last step in the manufacture of the E/VA copolymer to convert it to a physical form which is convenient to handle in subsequent operations, for example, incorporation into wax compositions.

The heat-sealable adhesive compositions of this invention have many applications in the paper industry for coating and laminating purposes, and can be used, for example, in the manufacture of wrapping papers for food packages and paperboard cartons and drums.

This invention is further illustrated by the following examples in which all parts and percentages are on a weight basis. In these examples wherein a paper substrate was coated with a petroleum wax composition and the coated paper evaluated for heat-seal bond strength, the same procedure was followed in all the tests in order to assure comparable results. In these examples, for each test, a paraffin wax blend was prepared containing the indicated amounts of E/VA copolymer and polyisobutylene by heating the components together with agitation at a temperature of about 250–300° F. The paraffin wax used in all these tests was a commercially available material having a melting range of 143–150° F. The molten paraffin wax composition at a temperature of 195–225° F. was then applied to both sides of a bread wrap paper on a Talboys T-Line laboratory coater, Model 1500C. The paper was a 25 lbs./ream clay-coated (one side) sulfite stock. The coatings were applied at a web speed of 30 ft./min. and after coating, the paper was immediately quenched in water at 70° F. or below. The coating weights were maintained within the range of 13.5 to 16.0 lbs./ream. Other studies have shown that differences in coating weights between these limits have no effect on the heat-seal performance of the coated paper.

Heat-seal bond strengths were determined by TAPPI Suggested Method T642SM-54, modified in that paper-to-paper seals were made between the pigmented sides of the two strips of paper coated as above instead of between the unpigmented sides as suggested by the TAPPI procedure. This modified procedure is more sensitive to small changes in heat-seal strength than the TAPPI method. The paper-to-paper seals were made on a Palo Myers sealer. The seal strengths were measured on an Instron Tensile Tester and the values reported represent the average of at least 5 and up to 9 measurements of the force in grams required to separate sealed strips of paper one inch wide.

*Example 1*

This example illustrates the comparable heat-seal strengths obtained with unmodified petroleum wax, petroleum wax containing solely an E/VA copolymer, and petroleum wax containing an E/VA copolymer and polyisobutylene. In Test 1 of this example, unmodified paraffin wax was evaluated. In Test 2 of this example, the wax contained 10% of an E/VA copolymer having a copolymerized vinyl acetate content of 29.2% and a melt index of 16.4. In Test 3 of this example, the wax contained 10% of a blend of 90% of the E/VA copolymer as used in Test 2 and 10% of commercial polyisobutylene having a manufacturer's specified Staudinger molecular weight of 81,000 to 99,000. The results of this example are summarized in Table 1:

TABLE 1

| Test No. | Percent Polymeric Additives in Composition | Percent Polyisobutylene (Based on E/VA plus Polyisobutylene) | Heat-Seal Bond Strength, g./in. |
| --- | --- | --- | --- |
| 1 | None | None | 13±0 |
| 2 | 10.0 | None | 98±5 |
| 3 | 10.0 | 10.0 | 191±10 |

As shown by these data, the replacement of only 10% of the E/VA copolymer with polyisobutylene surprisingly doubled the heat-seal bond strength.

*Example 2*

This example illustrates the marked effect obtained by the use of very small amounts of polyisobutylene in an E/VA copolymer-wax composition in accordance with this invention. In Test 1 of this example, the wax contained 10% of a blend of 97.5% E/VA copolymer and 2.5% of polyisobutylene. In Test 2 of this example, the wax contained 10% of a blend of 95% E/VA and 5% polyisobutylene. The composition ingredients were the same as used in Example 1. The results of this example are summarized in Table 2 (the results for Test 1 are for one trial):

TABLE 2

| Test No. | Percent Polymeric Additives in Composition | Percent Polyisobutylene (Based on E/VA plus Polyisobutylene) | Heat-Seal Bond Strength, g./in. |
| --- | --- | --- | --- |
| 1 | 10.0 | 2.5 | 192 |
| 2 | 10.0 | 5.0 | 189±2 |

These data demonstrate that the replacement of a very small proportion of the E/VA copolymer with polyisobutylene provides marked increases in the heat-seal bond strength.

This invention has been described and illustrated in considerable detail. Many variations in these details which do not depart from the spirit and scope of this invention will be obvious to those skilled in the art. Therefore, it is to be understood that this invention is not intended to be limited except as defined by the appended claims.

I claim:
1. A heat-sealable adhesive composition comprising, by weight, (1) about 90% petroleum wax, and (2) about 10% of polymeric additives, said polymeric additives comprising (A) about 90 to 97.5% of an ethylene/vinyl acetate copolymer having a copolymerized vinyl acetate content of 15 to 35% and a melt index of 0.1 to 500, and (B) about 2.5 to 10% of polyisobutylene having a molecular weight of 1000 to 250,000.

2. The composition of claim 1 wherein the said ethylene/vinyl acetate copolymer has a copolymerized vinyl acetate content of 26.5 to 31.5%.

References Cited by the Examiner

UNITED STATES PATENTS

| | | | |
|---|---|---|---|
| 3,046,238 | 7/1962 | Ridenour | 260—28.5 |
| 3,048,553 | 8/1962 | Moss | 260—28.5 |
| 3,117,101 | 1/1964 | Moyer | 260—28.5 |
| 3,146,214 | 8/1964 | Jakaitis | 260—28.5 |

References Cited by the Applicant

UNITED STATES PATENTS 2,877,196   3/1959   Reding.

FOREIGN PATENTS 1,287,912   2/1962   France.

MORRIS LIEBMAN, *Primary Examiner.*

J. A. GAZEWOOD, B. A. AMERNICK,
*Assistant Examiners.*